(12) United States Patent
You et al.

(10) Patent No.: US 12,384,283 B2
(45) Date of Patent: Aug. 12, 2025

(54) SEAT FOR VEHICLES

(71) Applicants: HYUNDAI MOTOR COMPANY, Seoul (KR); KIA CORPORATION, Seoul (KR); HYUNDAI TRANSYS INC., Seosan-si (KR)

(72) Inventors: Jung Sang You, Hwaseong-si (KR); Han Su Yoo, Hwaseong-si (KR); Guk Mu Park, Seoul (KR); Dong Woo Jeong, Gwacheon-si (KR); Myung Hoe Kim, Seoul (KR); Eun Sue Kim, Hwaseong-si (KR); Dae Hee Lee, Incheon (KR); Jae Hoon Cho, Hwaseong-si (KR); Han Kyung Park, Hwaseong-si (KR); Jae Sung Shin, Hwaseong-si (KR); Hae Dong Kwak, Hwaseong-si (KR); Kwon Hwa Bok, Hwaseong-si (KR); Jun sik Hwang, Hwaseong-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 401 days.

(21) Appl. No.: 17/983,697

(22) Filed: Nov. 9, 2022

(65) Prior Publication Data
US 2023/0406179 A1 Dec. 21, 2023

(30) Foreign Application Priority Data
Jun. 16, 2022 (KR) .......................... 10-2022-0073567

(51) Int. Cl.
*B60N 2/70* (2006.01)
*B60N 2/68* (2006.01)

(52) U.S. Cl.
CPC ............. *B60N 2/7035* (2013.01); *B60N 2/68* (2013.01)

(58) Field of Classification Search
CPC ................................ B60N 2/68; B60N 2/7035
USPC .................................................... 297/440.22
See application file for complete search history.

(56) References Cited

U.S. PATENT DOCUMENTS

| | | | | |
|---|---|---|---|---|
| 3,924,892 A | * | 12/1975 | Geier | B60N 2/7035 |
| | | | | 297/440.22 |
| 4,065,182 A | * | 12/1977 | Braniff | B60N 2/7005 |
| | | | | 297/440.22 X |
| 4,583,782 A | * | 4/1986 | Mikuniya | B60N 2/015 |
| | | | | 297/440.22 |
| 5,649,783 A | * | 7/1997 | Ichikawa | B60N 2/015 |
| | | | | 297/440.22 X |
| 6,761,411 B2 | * | 7/2004 | Boehmer | B60N 2/7005 |
| | | | | 297/440.22 |

FOREIGN PATENT DOCUMENTS

KR 2010-0122580 A 11/2010

* cited by examiner

*Primary Examiner* — Anthony D Barfield
(74) *Attorney, Agent, or Firm* — MCDONNELL BOEHNEN HULBERT & BERGHOFF LLP

(57) ABSTRACT

A seat for vehicles has an assembly structure configured such that a cushion assembly may be mounted on and separated from a seat base through a locking device, and thus allows a cover member configured to cover the cushion assembly to be easily replaced so as to prevent contamination of the cushion assembly and the seat base and damage thereto, such as rust generation, due to contaminants on the cover member.

15 Claims, 15 Drawing Sheets

SEAT FOR VEHICLES

CROSS REFERENCE TO RELATED APPLICATIONS

This application claims priority from Korean Patent Application No. 10-2022-0073567, filed on Jun. 16, 2022, in the Korean Intellectual Property Office, the disclosure of which is incorporated herein by reference in its entirety.

BACKGROUND

1. Field

The present disclosure relates to a seat for vehicles, and more particularly, to a seat for vehicles provided with a cushion assembly having an assembly structure configured such that the cushion assembly may be mounted on and detached from a seat base.

2. Description of the Related Art

Seats on which passengers sit are provided in a vehicle.

In general, a seat for vehicles is configured such that a cushion part is coupled to a seat base forming the frame of the seat, and the surface of the cushion part is covered with a cover member so as to be protected.

In the conventional seat for vehicles, in which the seat base and the cushion part are coupled to each other so as to be integrated, it is difficult to remove only the cushion part from the seat base, and thereby, it is difficult to replace the cover member with a new one and thus, contaminants on the cover member may contaminate the cushion part and the seat base and damage the cushion part and the seat base, i.e., generate rust thereon.

The above information disclosed in the Background section is only for enhancement of understanding of the background of the disclosure and should not be interpreted as conventional technology that is already known to those skilled in the art.

SUMMARY

Therefore, the present disclosure has been made in view of the above problems, and it is an object of the present disclosure to provide a seat for vehicles provided with a cushion assembly having an assembly structure configured such that the cushion assembly may be mounted on and detached from a seat base, and thus allows a cover member configured to cover the cushion assembly to be easily replaced so as to prevent contamination of the cushion assembly and the seat base and damage thereto, such as rust generation, due to contaminants on the cover member.

In accordance with an aspect of the present disclosure, the above and other objects can be accomplished by the provision of a seat for vehicles including a seat base, a cushion assembly coupled to and assembled with the seat base so as to be separable therefrom, and a locking device configured to couple and separate the cushion assembly to and from the seat base.

The seat base may include seat frames configured to form a frame of the seat for vehicles, and formed of steel, and a frame cover coupled to the seat frames so as to cover the seat frames, and formed of plastic.

The cushion assembly may include a cushion panel having a designated size, a cushion pad configured to surround the cushion panel, and a cover member configured to surround and cover the cushion pad.

The cushion panel may be formed by insert injection molding, and may be coupled to the cushion pad so as to be surrounded by the cushion pad.

The locking device may include a locking button provided on the seat base and pressed by a user to be operated, a locking plate connected to the locking button and having a locking hole formed therethrough, and a locking hook provided on the cushion assembly so as to be inserted into the locking hole, and coupled to or separated from the locking plate depending on whether or not the locking button is operated.

The locking device may further include return springs installed such that both ends thereof are supported by the seat base and the locking button so as to supply restoring force to the locking button.

A button recess opened upwards may be formed in the seat base, and the locking button may be installed to be supported by the return springs inserted into the button recess so as to be movable upwards and downwards.

Button flanges may protrude outwards from the locking button, flange holes configured such that the button flanges are inserted thereinto may be formed in the button recess, and, when the locking button is returned to an original position thereof by spring force of the return springs, the button flanges may be caught by upper ends of the flange holes and may thus fixed, and an initial position of the locking button may be determined.

When a user does not press the locking button, an upper surface of the locking button may be located below an upper surface of the seat base so that the locking button maintains a state of being inserted into the button recess.

The locking plate may be provided to extend downwards from the locking button, guide parts configured to extend downwards from the button recess may be provided in the seat base, and left and right sides of the locking plate may be inserted into the guide parts so as to be movable upwards and downwards along the guide parts.

The locking hook may protrude rearwards from a rear end of the cushion assembly toward the locking plate, a hook groove may be formed in a rear end of the locking hook, and, when the locking plate is inserted into the hook groove, the cushion assembly may be in a locked state, and, when the locking plate is released from the hook groove, the cushion assembly may be in an unlocked state.

In the locked state of the cushion assembly, the rear end of the cushion assembly may be compressed due to contact with the seat base, and may accumulate elastic force therein, and, in the unlocked state of the cushion assembly, a shape of the rear end of the compressed cushion assembly may be restored, and the cushion assembly may be moved forwards to a designated distance with respect to the seat base while restoring the shape of the rear end of the compressed cushion assembly.

Front hooks may be provided at positions of the cushion assembly spaced forwards apart from the locking hook, and, when the cushion assembly is in the locked state due to coupling between the locking hook and the locking plate, the front hooks may be assembled with the seat base.

In accordance with another aspect of the present disclosure, there is provided a seat for vehicles, wherein a cushion assembly is separably coupled to a seat base, the cushion assembly includes a cushion pad formed of a cushioning material and a cover member configured to cover the cushion pad, and the cover member is replaced by separating the cushion assembly from the seat base and then separating the cover member from the cushion pad.

When a user presses a locking button installed in the seat base, coupling between the locking button and a locking hook provided on the cushion assembly may be released, and, when coupling between the locking button and the locking hook is released, the cushion assembly may be in a state of being separable from the seat base.

When the locking button and the locking hook are coupled to each other, the seat base and the cushion assembly may be coupled to each other, and the cushion assembly may be placed on the seat base and be assembled therewith.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Figure 1:
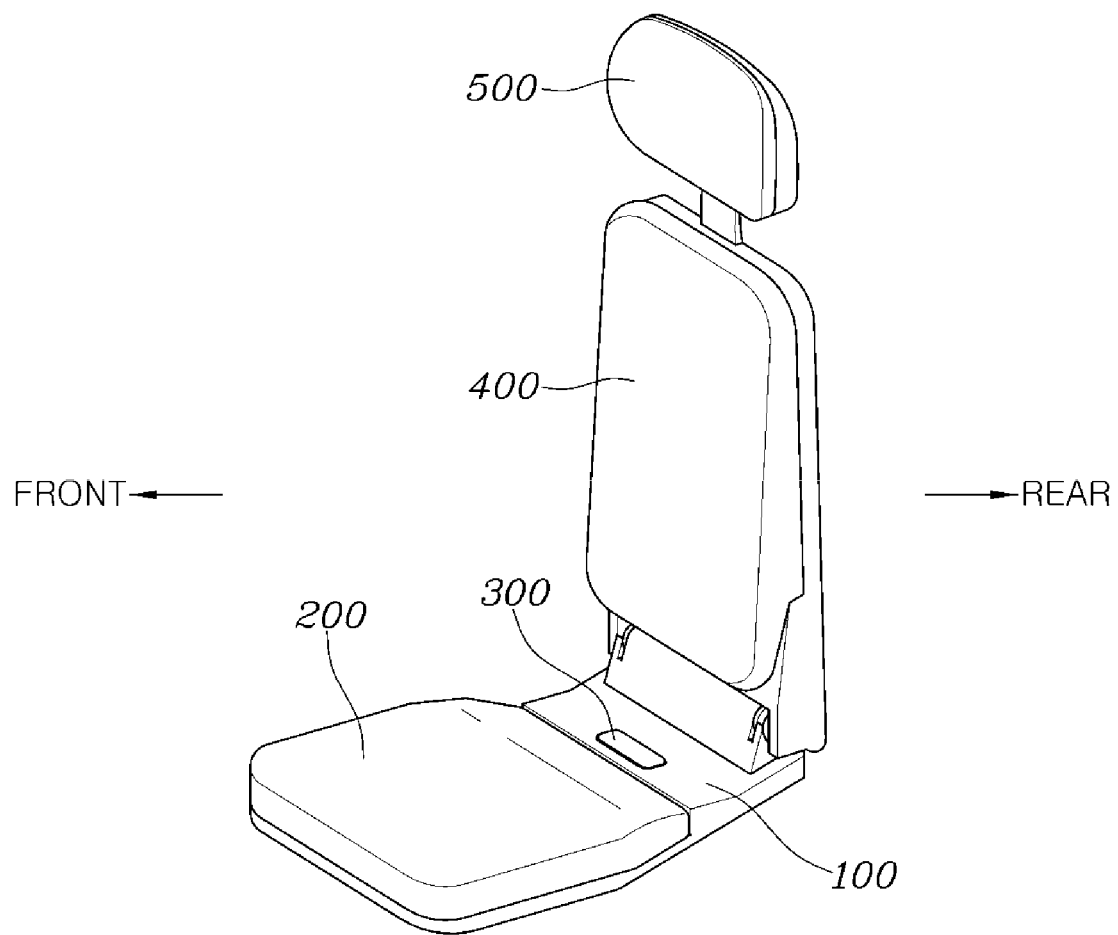
FIG. 1 is a perspective view of a seat for vehicles according to the present disclosure.
Figure 2:
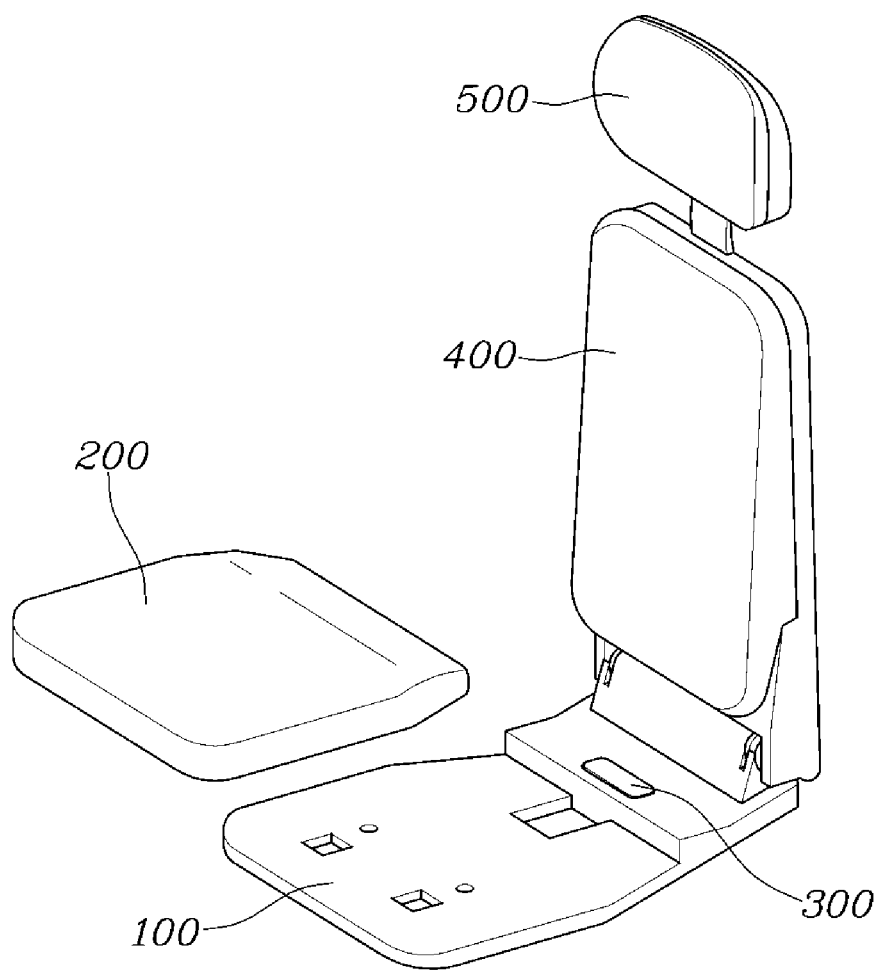
FIG. 2 is a view showing the state in which a cushion assembly is removed from the seat for vehicles shown in FIG. 1.
Figure 3:
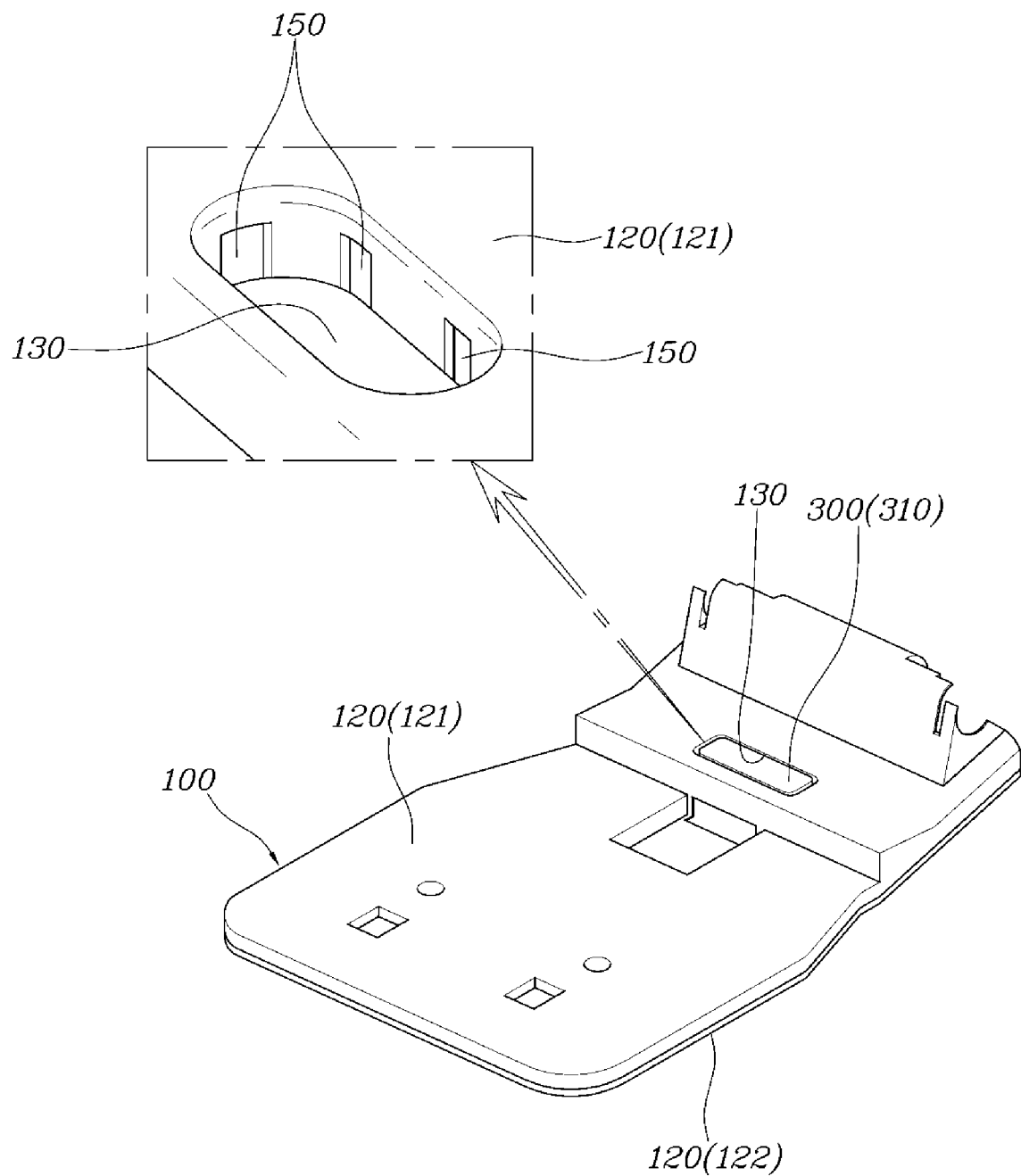
FIG. 3 is a perspective view of a seat base.
Figure 4:
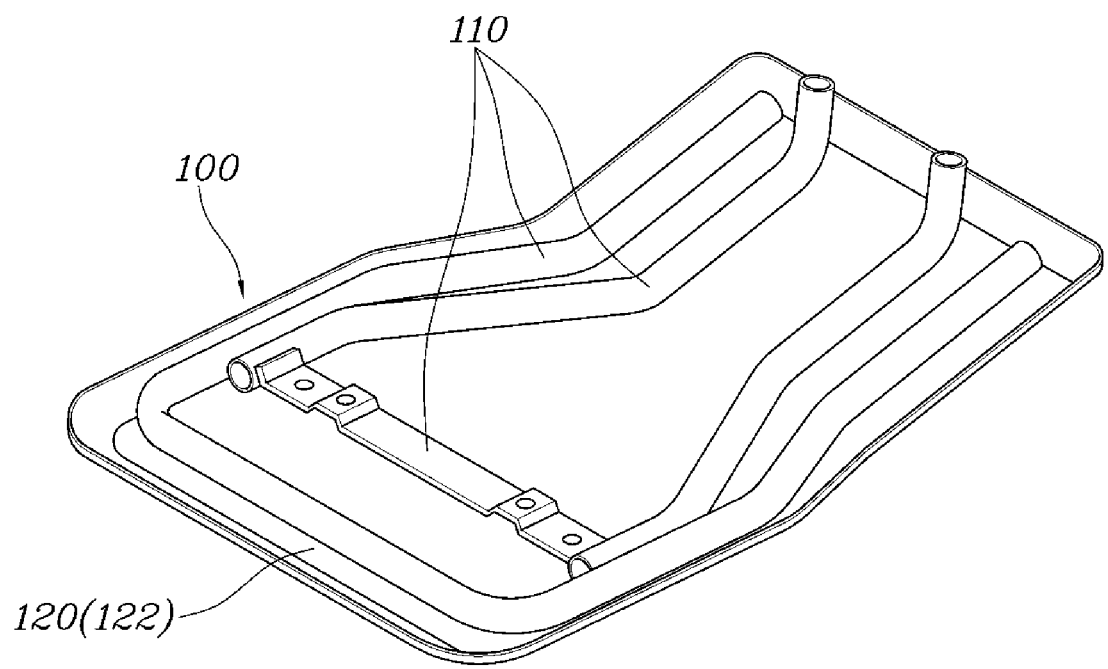
FIG. 4 is a view showing the state in which an upper cover is removed from the seat base shown in FIG. 3.
Figure 5:
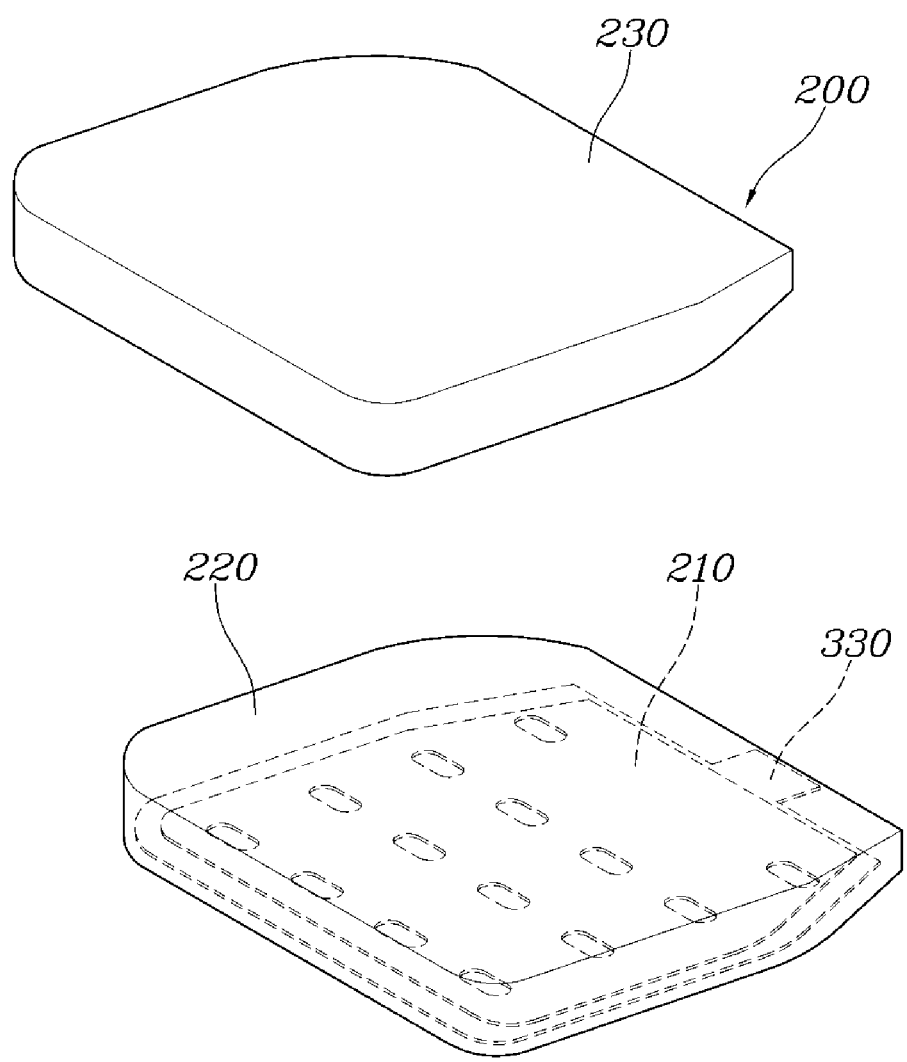
FIGS. 5, 6, and 7 are perspective views illustrating the cushion assembly, a cushion panel, and a locking device, respectively.
Figure 6:
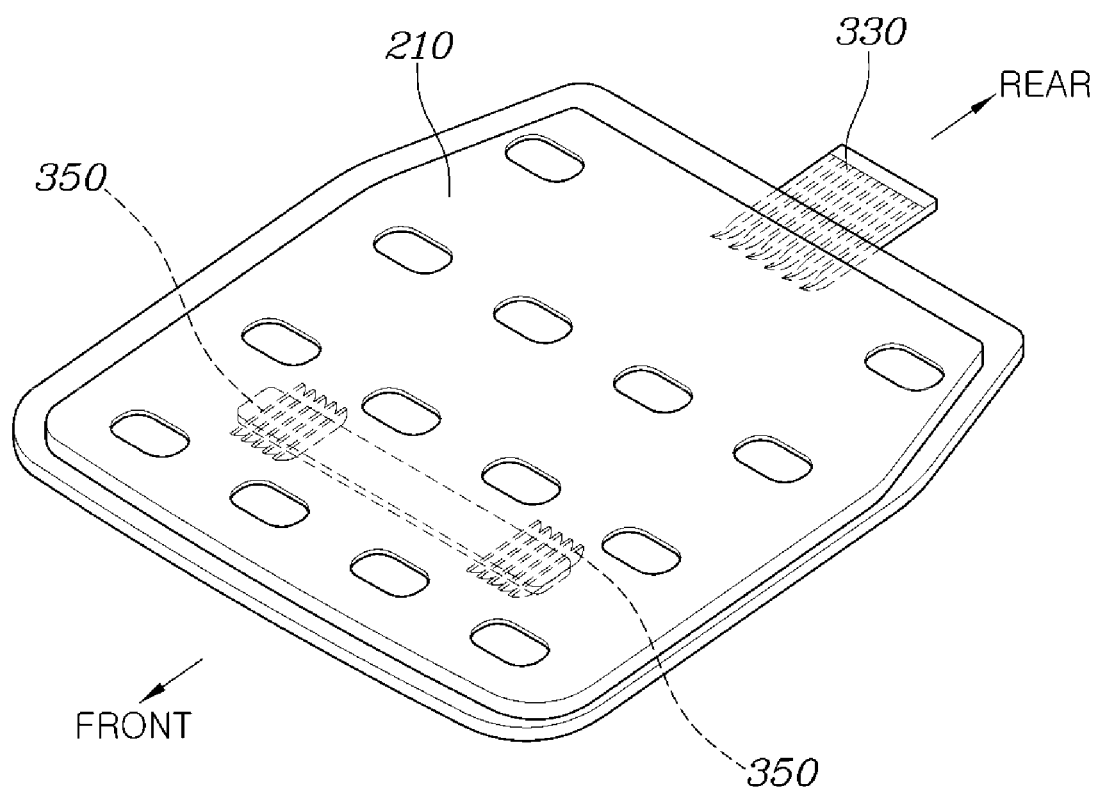
Figure 7:
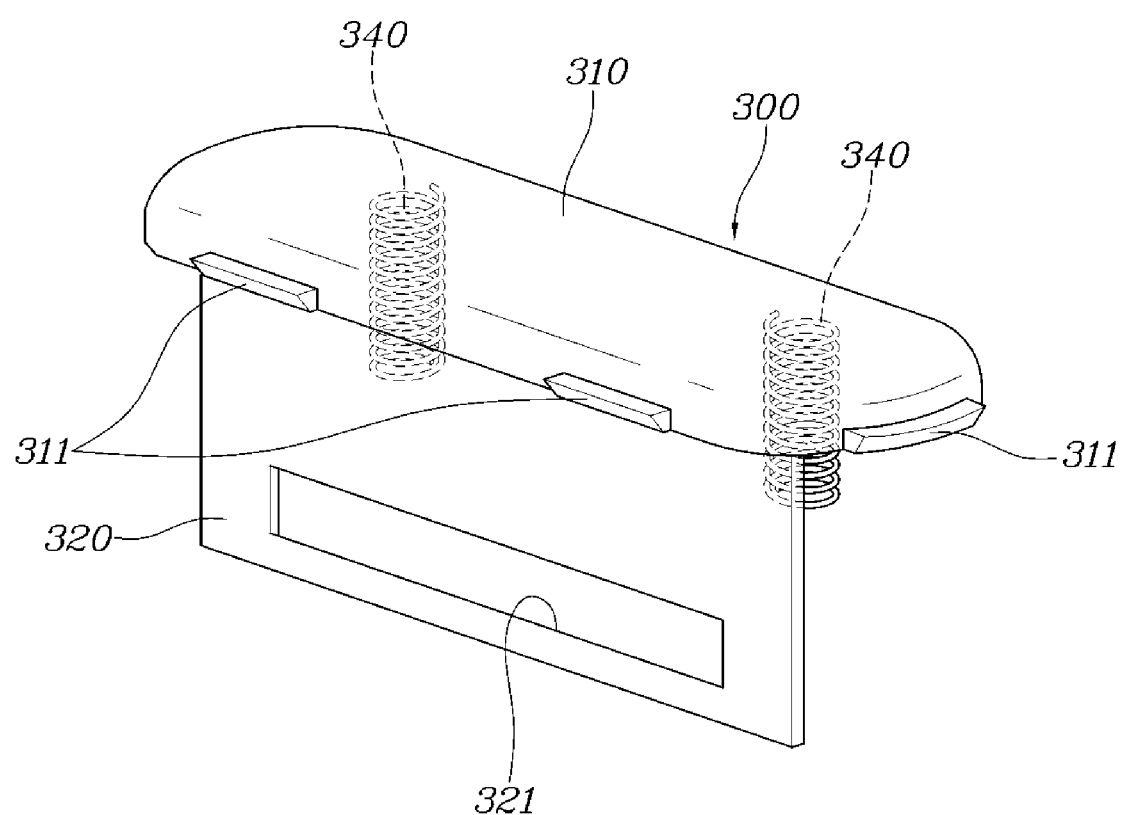
Figure 8:
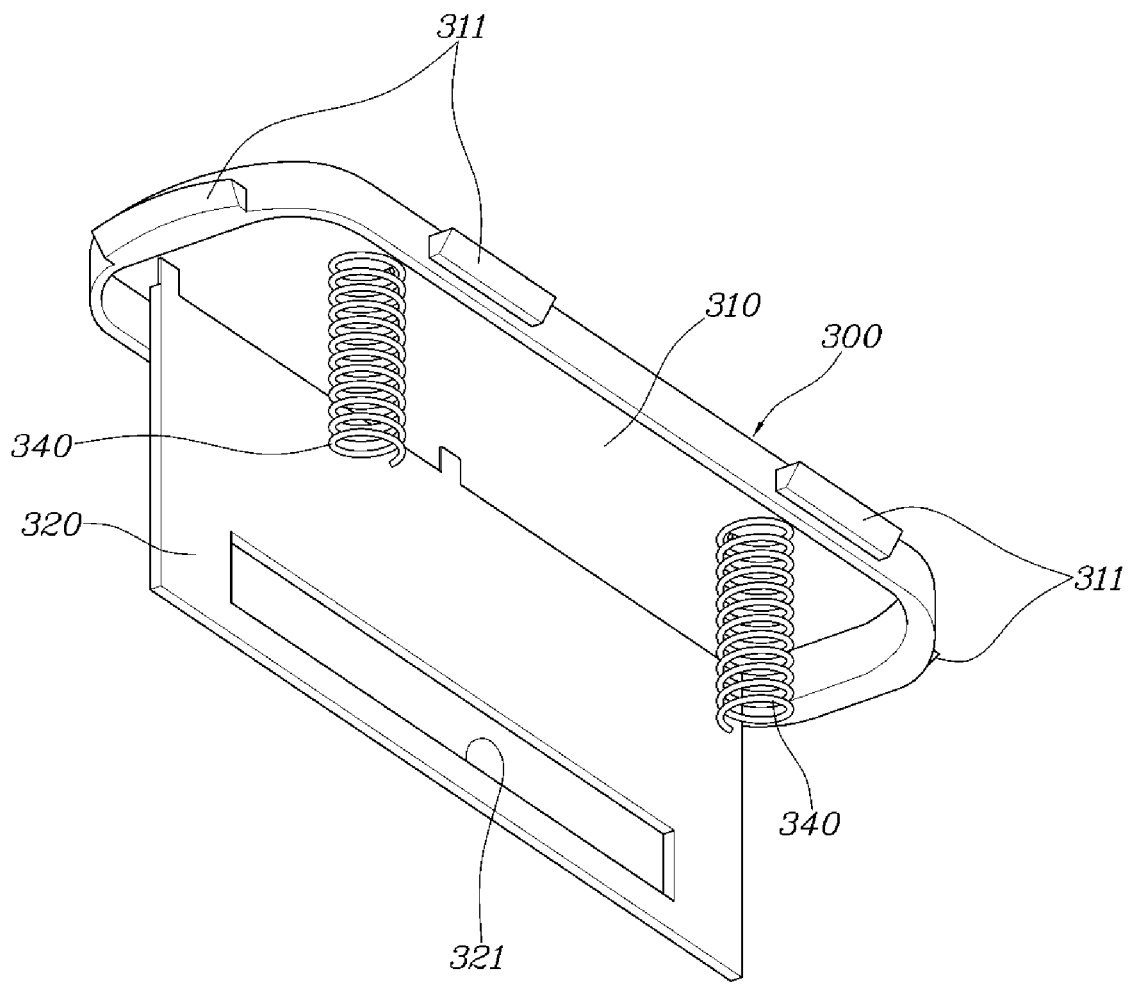
FIG. 8 is a bottom perspective view of FIG. 7.
Figure 9:
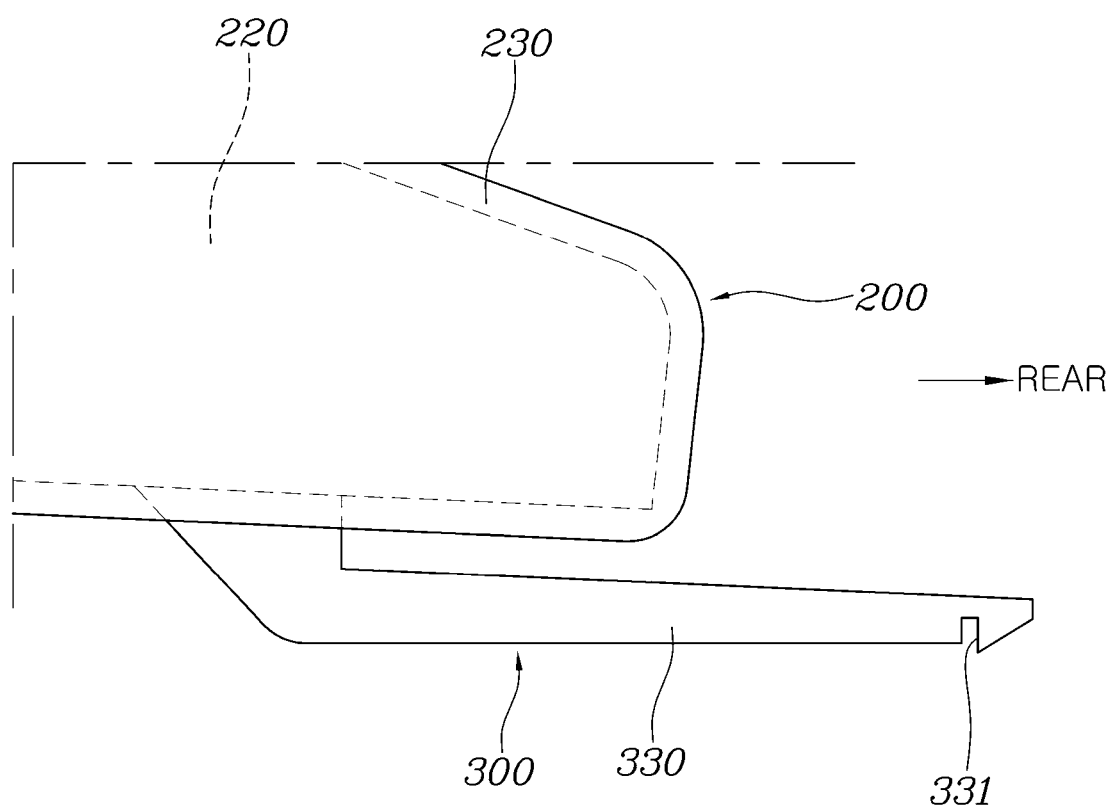
FIG. 9 is a side view of a portion of the cushion assembly to which a locking hook is coupled.
Figure 10:
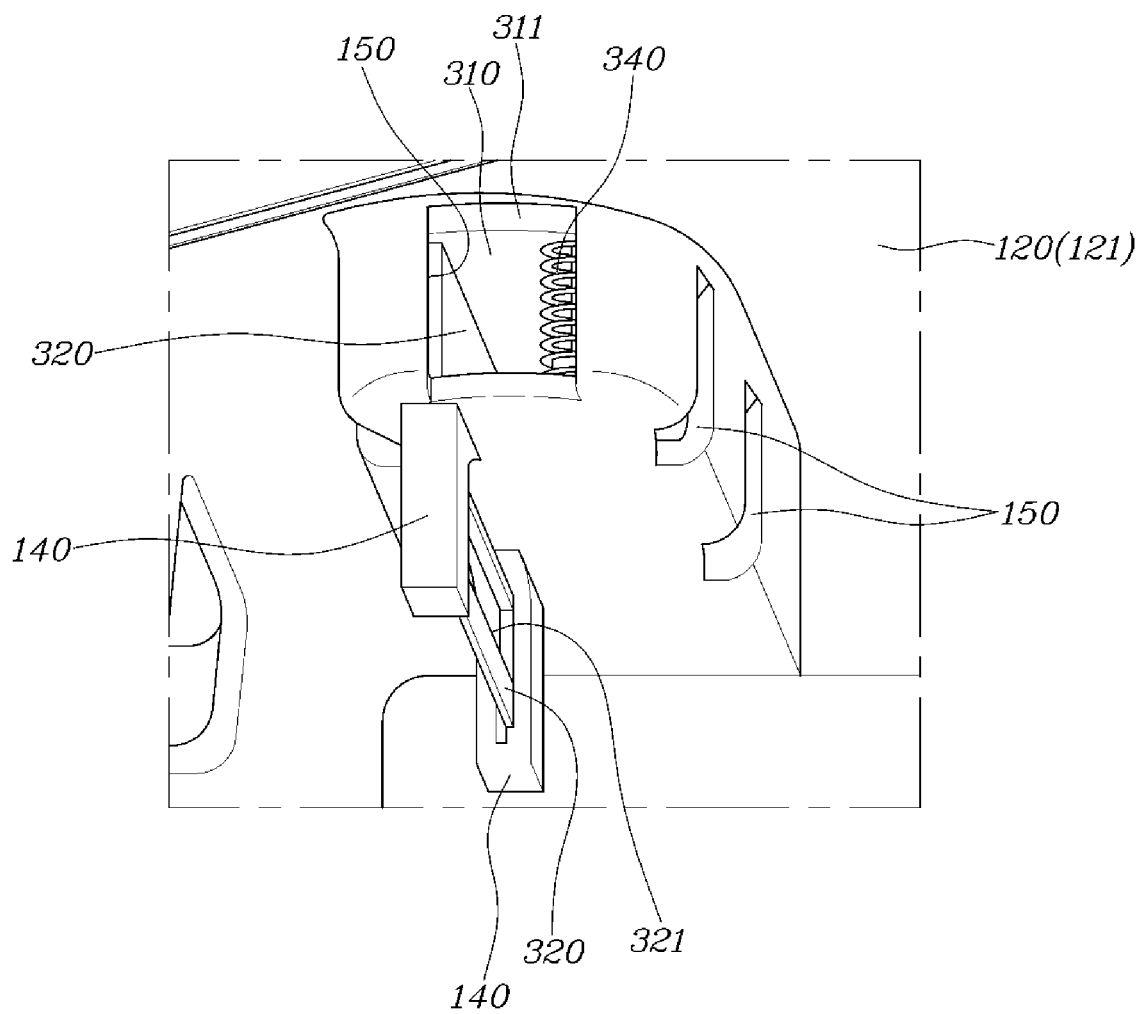
FIG. 10 is a bottom perspective view showing a button recess to which the locking device is coupled.

Reference will now be made in detail to exemplary embodiments of the present disclosure, examples of which are illustrated in the accompanying drawings. Wherever possible, the same reference numbers will be used throughout the drawings to refer to the same or like parts, and a redundant description thereof will be omitted.

In the following description of the embodiments, suffixes, such as "module", "part" and "unit", are provided or used interchangeably merely in consideration of ease in statement of the specification, and do not have meanings or functions distinguished from one another.

In the following description of the embodiments of the present disclosure, a detailed description of known functions and configurations incorporated herein will be omitted when it may make the subject matter of the present disclosure rather unclear.

Further, the accompanying drawings will be exemplarily given to describe the embodiments of the present disclosure, and should not be construed as being limited to the embodiments set forth herein, and it will be understood that the embodiments of the present disclosure are provided only to completely disclose the disclosure and cover modifications, equivalents or alternatives which come within the scope and technical range of the disclosure.

In the following description of the embodiments, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present.

In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Further, "unit" or "control unit" included in "motor control unit (MCU)", "hybrid control unit (HCU)", etc. is widely used to name a controller configured to control a specific function of a vehicle, and does not indicate a generic functional unit.

A controller may include a communication device configured to communicate with other controllers or sensors so as to control an assigned function, a memory configured to store an operating system, logic commands, input and output information, etc., and at least one processor configured to perform determination, calculation, judgement, etc. necessary to control the assigned function.

Hereinafter, a seat for vehicles according to an exemplary embodiment of the present disclosure will be described with reference to the accompanying drawings.

The seat for vehicles according to the present disclosure includes, as shown in FIGS. 1 to 15, a seat base 100, a cushion assembly 200 coupled to and assembled with the seat base 100 so as to be separable therefrom, and a locking device 300 configured to couple and separate the cushion assembly 200 to and from the seat base 100.

The seat for vehicles according to the present disclosure may be assembled by coupling the seat base 100 and the cushion assembly 200 to each other, or may be disassembled by separating the seat base 100 and the cushion assembly 200 from each other, through operation of the locking device 300.

The seat for vehicles according to the present disclosure may further include a back assembly 400 and a headrest 500.

The back assembly 400 may be coupled to and assembled with the seat base 100 so as to be separable therefrom by a locking device, in the same manner as the cushion assembly 200.

A back part of the seat base 100, to which the back assembly 400 is coupled, may be rotated in the forward and rearward directions about a cushion part of the seat base 100, to which the cushion assembly 200 is coupled, and thus, the angle of the back part of the seat base 100 may be adjusted.

The headrest 500 may be coupled to the seat base 100 so as to be separable therefrom, and may be coupled to the seat base 100 such that the height of the headrest 500 from the seat base 100 is adjustable, as needed.

The seat base 100 includes a plurality of seat frames 110 configured to form the frame of the seat for vehicles, and a frame cover 120 coupled to the seat frames 110 so as to cover the seat frames 110.

The seat frames 110 are formed of steel, the frame cover 120 is formed of plastic, and the seat fames 110 are located inside the frame cover 120.

In order to facilitate assembly of the seat frames 110 and the frame cover 120, the frame cover 120 is provided as an assembly of an upper cover 121 and a lower cover 122, and the seat frames 110 are located between the upper cover 121 and the lower cover 122.

Multiple points of the front parts of the seat frames 110 and multiple points of the rear parts of the seat frames 110 are firmly assembled with the upper cover 121 and the lower cover 122 by screws.

The cushion assembly 200 includes a cushion panel 210 having a designated size, a cushion pad 220 configured to surround the cushion panel 210, and a cover member 230 configured to surround and cover the cushion pad 220.

The cushion panel 210 is formed to have a rectangular shape, and is formed of plastic so as to increase stiffness of the cushion assembly 200.

The cushion pad 220 is a foam pad formed of a cushioning material, and the cushion panel 210 is formed by insert injection molding and is coupled to the cushion pad 220 so as to be surrounded by the cushion pad 220.

The cover member 230 surrounds the cushion pad 220 so as to protect the cushion pad 220 from foreign substances, and may be formed of fabric or leather.

Since the cover member 230 is coupled to the cushion pad 220 so as to be separable therefrom, when the cover member 230 is contaminated with foreign substances, a worker may separate the cushion assembly 200 from the seat base 100 by operating the locking device 300, may separate the contaminated cover member 230 from the cushion pad 220, and may then replace the contaminated cover member 230 with a new clean cover member 230.

The locking device 300 includes a locking button 310 provided on the seat base 100 and pressed by a user to be operated, a locking plate 320 connected to the locking button 310 and having a locking hole 321 formed therethrough, a locking hook 330 provided on the cushion assembly 200 so as to be inserted into the locking hole 321, and coupled to or separated from the locking plate 320 depending on whether or not the locking button 310 is operated, and return springs 340 installed such that both ends thereof are supported by the seat base 100 and the locking button 310 so as to supply restoring force to the locking button 310.

A button recess 130 which is opened upwards is formed in the seat base 100, and the locking button 310 is installed to be inserted into the button recess 130.

The button recess 130 is formed in the rear portion of the upper cover 121 of the frame cover 120 of the seat base 100 so as to be opened upwards, and the locking button 310 is installed in the button recess 130 so as to be movable upwards and downwards.

The locking plate 320 may be formed integrally with the locking button 310 so as to extend downwards from the locking button 310, and the locking hole 321 is formed through the locking plate 320 in the forward and rearward directions.

When the locking button 310 is installed in the button recess 130, the locking plate 320 penetrates the button recess 130 and protrudes downwards from the button recess 130, and the locking hole 321 is located below the button recess 130.

When the user presses the locking button 310, the locking plate 320 together with the locking button 310 is moved. Here, in order to guide movement of the locking plate 320, guide parts 140 extending downwards from the button recess 130 are provided in the seat base 100, and the left and right sides of the locking plate 320 are inserted into the guide parts 140 and are thus moved upwards and downwards along the guide parts 140.

The guide parts 140 are formed integrally with the upper cover 121 of the frame cover 120 of the seat base 100 so as to protrude downwards.

The return springs 340 are provided as compression coil springs, are provided in plural, and are installed to be inserted into the button recess 130.

The lower ends of the return springs 340 are supported by the bottom of the button recess 130, and the upper ends of the return springs 340 are supported by the locking button 310.

Therefore, when the user presses the locking button 310 and thus the locking button 310 is moved toward the bottom of the button recess 130, the return springs 340 are compressed, and, when the user releases operating force from the locking button 310, the locking button 310 is moved to the top of the button recess 130 and is thus returned to the original position of the locking button 310 by the elastic force of the return springs 340.

A plurality of button flanges 311 protrudes outwards from the locking button 310, and flange holes 150, into which the button flanges 311 are inserted, are formed in the button recess 130.

The button flanges 311 and the flange holes 150 may be formed in the same number.

When the locking button 310 is installed in the button recess 130, the button flanges 311 are inserted into the flange holes 150.

Therefore, when the user presses the locking button 310, the locking button 310 is moved toward the bottom of the button recess 130 and the button flanges 311 are moved downwards along the flange holes 150, and, when the user releases operating force from the locking button 310, the locking button 310 is moved toward the top of the button recess 130 and the button flanges 311 are moved upwards along the flange holes 150 and are thus returned to the original positions of the button flanges 311.

As such, when the locking button 310 is returned to the original position thereof using spring force of the return springs 340, the button flanges 311 are caught by the upper ends of the flange holes 150 and are thus fixed, and thereby, the initial position of the locking button 310 is determined.

That is, contact between the button flanges 311 and the flange holes 150 serves as a stopper which determines the initial position (i.e., the returned position) of the locking button 310.

On the other hand, when the user does not operate the locking button 310, i.e., does not press the locking button 310, the upper surface of the locking button 310 is located below the upper surface of the seat base 100 and thus the locking button 310 maintains the state of being inserted into the button recess 130.

Figure 11:
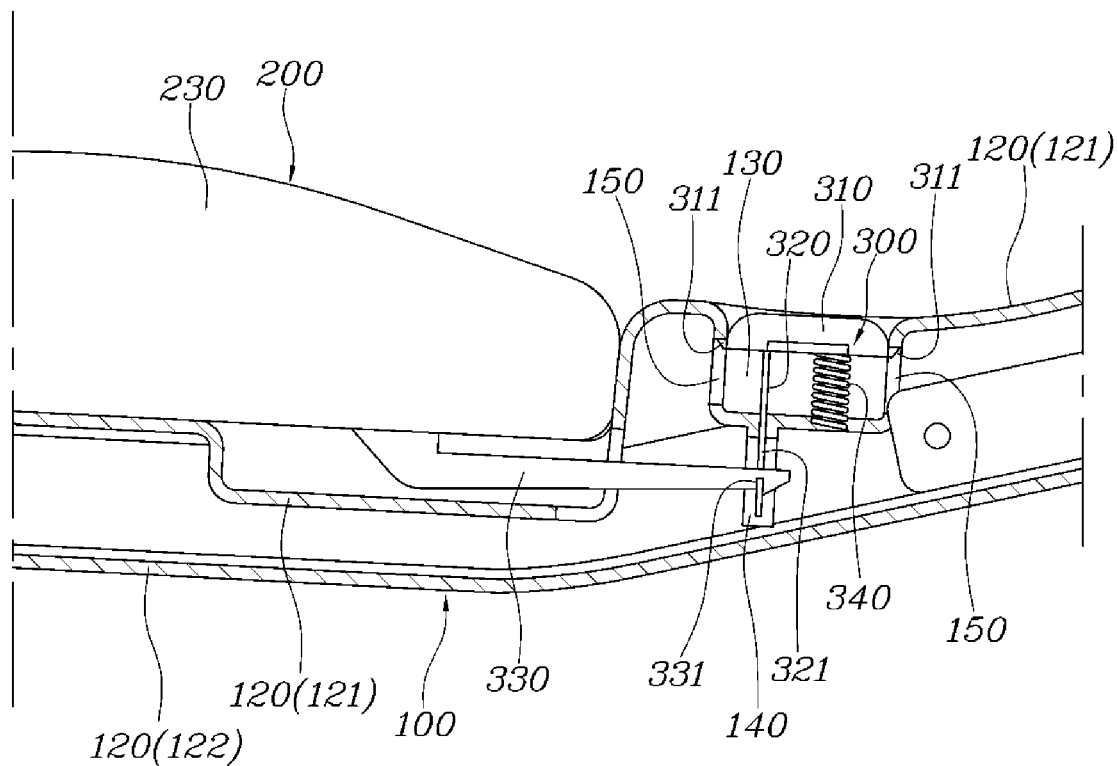
FIGS. 11 and 12 are views illustrating the locked state of the cushion assembly.
Figure 12:
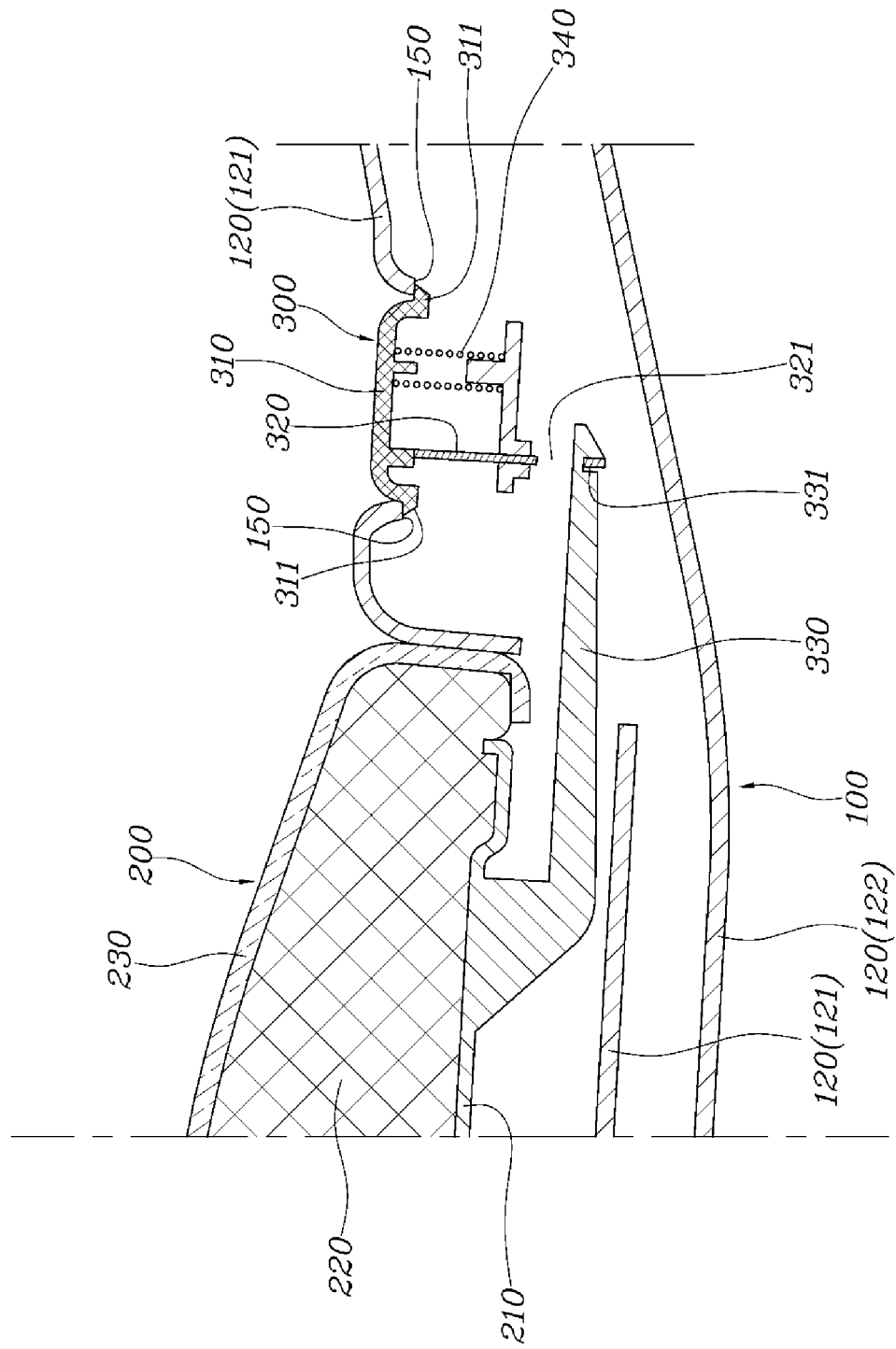

When the locking button 310 is returned to the initial position by the spring force of the return springs 340, i.e., when the button flanges 311 come into contact with the upper ends of the flange holes 150 and thus the locking button 310 is fixed, the upper surface of the locking button 310 is located below the upper surface of the seat base 100 and thus the locking button 310 maintains the initial state of being inserted into the button recess 130, as shown in FIGS. 11 and 12.

In the case in which the upper surface of the locking button 310 is located above the upper surface of the seat base 100 and thus the locking button 310 protrudes upwards from the button recess 130, there is a possibility that the locking button 310 would be pressed by a passenger sitting on the cushion assembly 200 and thereby the cushion assembly 200 would be separated from the seat base 100 due to unintentional unlocking of the locking device 300. In order to prevent such a case, the upper surface of the locking button 310 may be located below the upper surface of the seat base 100 in the initial state.

The locking hook 330 protrudes rearwards from the rear end of the cushion assembly 200 toward the locking plate 320.

That is, the locking hook 330 is formed integrally with the cushion panel 210 of the cushion assembly 200 so as to protrude rearwards from the rear end of the cushion panel 210, and a hook groove 331 which is concave upwards is formed in the bottom surface of the rear end of the locking hook 330.

Figure 15:
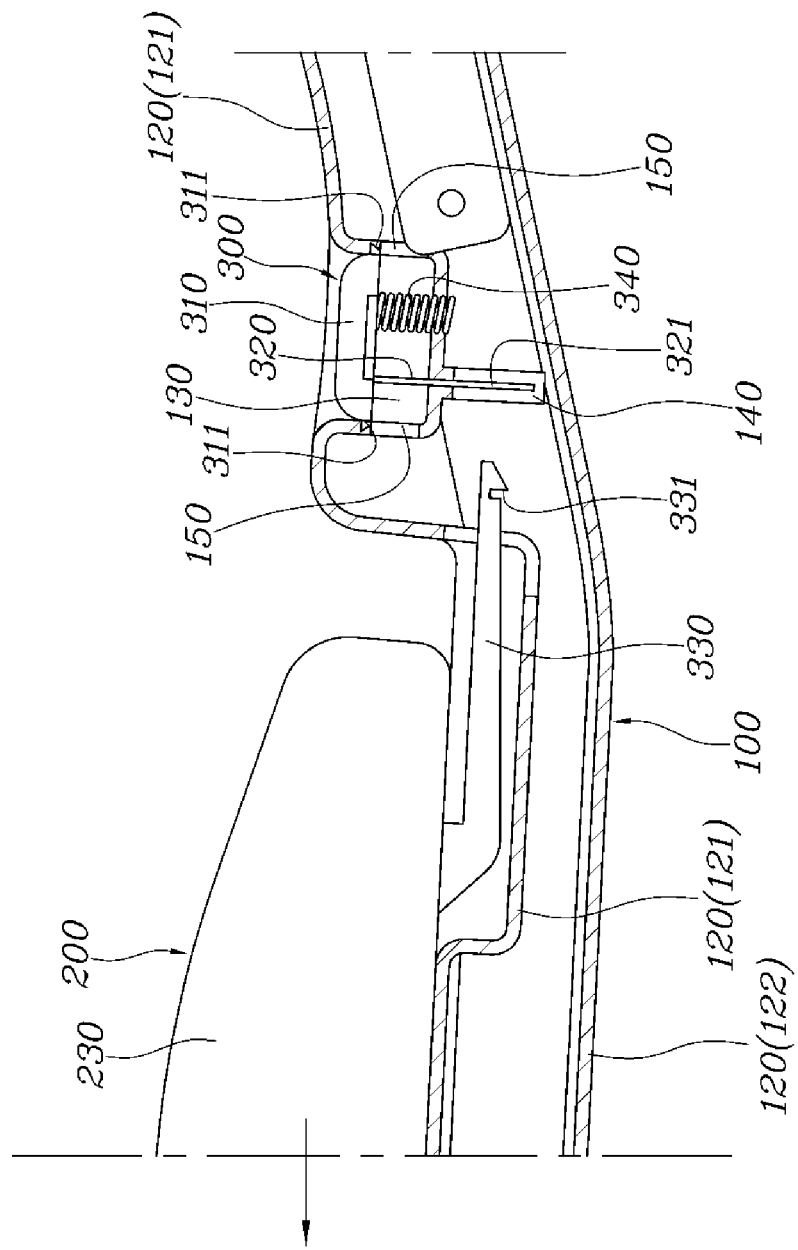

Therefore, when the locking plate 320 is inserted into the hook groove 331 in the state in which the rear end of the locking hook 330 passes through the locking hole 321, as shown in FIGS. 11 and 12, the cushion assembly 200 is in the locked state by the locking device 300, and, when the locking plate 320 is moved downwards by pressing the locking button 310 and thus the locking plate 320 is released from the hook groove 331, as shown in FIG. 15, the cushion assembly 200 is in the unlocked state.

When the cushion assembly 200 is in the locked state, as shown in FIGS. 11 and 12, the rear end of the cushion assembly 200 is compressed due to contact with the seat base 100, and accumulates elastic force therein.

That is, in the locked state of the cushion assembly 200 in which the cushion assembly 200 is coupled to the seat base 100 by the locking device 300, the rear end of the cushion assembly 200 including the cushion pad 220 is compressed due to contact with the seat base 100, and accumulates elastic force therein.

Figure 14:
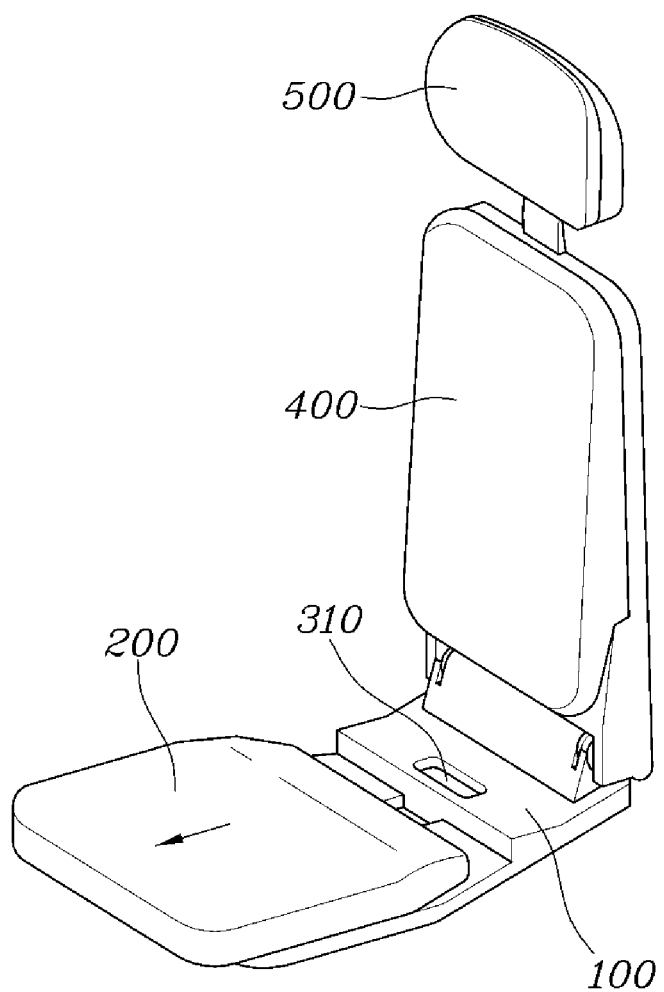
FIGS. 14 and 15 are views illustrating the unlocked state of the cushion assembly.

Further, the cushion assembly 200 is unlocked by operating the locking device 300, the shape of the rear end of the compressed cushion assembly 200 is restored, and the cushion assembly 200 is moved forwards to a designated distance with respect to the seat base 100 while restoring the shape of the rear end of the compressed cushion assembly 200, as shown in FIGS. 14 and 15, and thereby, the worker may easily separate the unlocked cushion assembly 200 from the seat base 100.

Front hooks 350 are provided on the cushion assembly 200 at positions spaced forwards apart from the locking hook 330.

The locking hook 330 protrudes from the rear end of the cushion panel 210 of the cushion assembly 200, and a plurality of the front hooks 350 is formed integrally with designated regions of the cushion panel 210 spaced forwards apart from the locking hook 330 so as to protrude rearwards therefrom.

Figure 13:
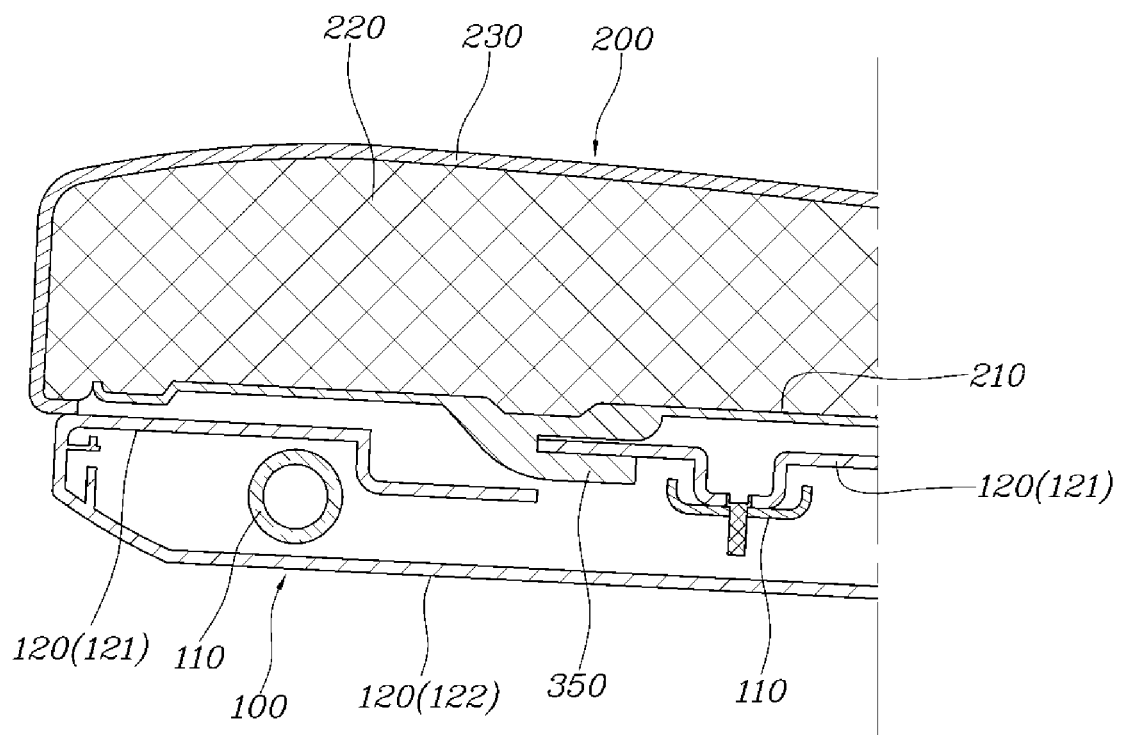
FIG. 13 is a view of a portion of the cushion assembly to which a front hook is coupled.

The front hooks 350 are provided with concave recesses which are opened rearwards, and the front hooks 350 are coupled with the seat base 100, as shown in FIG. 13, when the cushion assembly 200 is locked by coupling the locking plate 320 to the hook groove 331 of the locking hook 330.

That is, the upper cover 121 of the seat base 100 is inserted into the concave recesses of the front hooks 350, which are opened rearwards, and is thus assembled with the front hooks 350, and the cushion assembly 200 may more firmly maintain coupling force to the seat base 100 by assembly of the seat base 100 with the front hooks 350.

The seat for vehicles according to the present disclosure is characterized in that the cushion assembly 200 is separably coupled to the seat base 100, the cushion assembly 200 includes the cushion pad 220 formed of a cushioning material and the cover member 230 configured to cover the cushion pad 220, and the cover member 230 may be replaced with a new one by separating the cushion assembly 200 from the seat base 100 and then separating the cover member 230 from the cushion pad 220.

Further, in the seat for vehicles according to the present disclosure, when the user presses the locking button 310 installed on the seat base 100, coupling between the locking button 310 and the locking hook 330 provided on the cushion assembly 200 is released, and the cushion assembly 200 is in the state of being separable from the seat base 100 when coupling between the locking button 310 and the locking hook 330 is released.

Further, in the seat for vehicles according to the present disclosure, when the locking button 310 and the locking hook 330 are coupled to each other, the seat base 100 and the cushion assembly 200 are coupled to each other and thus the cushion assembly 200 is in the locked state, and the cushion assembly 200 is placed on the seat base 100 and is assembled therewith, in the locked state of the cushion assembly 200.

As described above, the seat for vehicles according to the present disclosure has the assembly structure configured such that the cushion assembly 200 may be mounted on and separated from the seat base 100 through the locking device 300, and thus allows the cover member 230 configured to cover the cushion assembly 200 to be easily replaced so as to prevent contamination of the cushion assembly 200 and the seat base 100 and damage thereto, such as rust generation, due to contaminants on the cover member 230.

As is apparent from the above description, a seat for vehicles according to the present disclosure has an assembly structure configured such that a cushion assembly may be mounted on and separated from a seat base through a locking device, thereby allowing a cover member configured to cover the cushion assembly to be easily replaced so as to prevent contamination of the cushion assembly and the seat base and damage thereto, such as rust generation, due to contaminants on the cover member.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A seat for vehicles comprising:
   a seat base;
   a cushion assembly removably coupled to the seat base; and
   a locking device configured to lock and unlock the cushion assembly and the seat base;
   wherein the locking device comprises:
      a locking button positioned on the seat base configured to be pressed by a user;
      a locking plate connected to the locking button and having a locking hole formed therethrough; and a locking hook positioned on the cushion assembly configured to be inserted into the locking hole, and configured to be separated from the locking plate when the locking button is pressed.

2. The seat for vehicles according to claim 1, wherein the seat base comprises:
a plurality of seat frames configured to form a frame of the seat, the plurality of seat frames being formed of steel; and
a frame cover coupled to the plurality of seat frames to cover the seat frames, the frame cover being formed of plastic.

3. The seat for vehicles according to claim 1, wherein the cushion assembly comprises:
a cushion panel having a designated size;
a cushion pad configured to surround the cushion panel; and
a cover member configured to surround and cover the cushion pad.

4. The seat for vehicles according to claim 3, wherein the cushion panel is formed by insert injection molding, and is coupled to and surrounded by the cushion pad.

5. The seat for vehicles according to claim 1, wherein the locking device further comprises:
a plurality of return springs positioned such that both ends of each of the plurality of return springs are supported by the seat base and the locking button to a supply restoring force to the locking button.

6. The seat for vehicles according to claim 5, wherein:
the seat base further comprises a button recess opened upwards; and
the locking button is supported by the plurality of return springs inserted into the button recess to be movable upwards and downwards.

7. The seat for vehicles according to claim 6, wherein:
a plurality of button flanges protrude outwards from the locking button;
the plurality of button flanges are inserted in a plurality of flange holes formed in the button recess; and
when the locking button is returned to an original position by a spring force of the plurality of return springs, the button flanges are caught by upper ends of the flange holes and are fixed, and an initial position of the locking button is determined.

8. The seat for vehicles according to claim 6, wherein, when a user does not press the locking button, an upper surface of the locking button is located below an upper surface of the seat base so the locking button remains inserted in the button recess.

9. The seat for vehicles according to claim 8, wherein:
the locking plate extends downwards from the locking button;
the seat bases further comprises a plurality of guide parts configured to extend downwards from the button recess; and
left and right sides of the locking plate are configured to be inserted into the plurality of guide parts be movable upwards and downwards along the plurality of guide parts.

10. The seat for vehicles according to claim 1, wherein:
the locking hook protrudes rearwards from a rear end of the cushion assembly toward the locking plate;
a hook groove is formed in a rear end of the locking hook; and
when the locking plate is inserted into the hook groove, the cushion assembly is in a locked state, and, when the locking plate is released from the hook groove, the cushion assembly is in an unlocked state.

11. The seat for vehicles according to claim 10, wherein:
in the locked state of the cushion assembly, the rear end of the cushion assembly is compressed due to contact with the seat base, and accumulates an elastic force, and, in the unlocked state of the cushion assembly, a shape of the rear end of the compressed cushion assembly is restored, and the cushion assembly is moved forwards to a designated distance with respect to the seat base while restoring the shape of the rear end of the compressed cushion assembly.

12. The seat for vehicles according to claim 1, wherein:
a plurality of front hooks are provided at positions of the cushion assembly spaced forwards apart from the locking hook; and
when the cushion assembly is in the locked state due to coupling between the locking hook and the locking plate, the front hooks are assembled with the seat base.

13. A seat for vehicles, wherein:
a cushion assembly removably coupled to a seat base;
the cushion assembly comprises a cushion pad formed of a cushioning material and a cover member configured to cover the cushion pad; and
the cover member is replaced by separating the cushion assembly from the seat base, and then separating the cover member from the cushion pad;
wherein the locking device comprises:
a locking button positioned on the seat base configured to be pressed by a user;
a locking plate connected to the locking button and having a locking hole formed therethrough; and
a locking hook positioned on the cushion assembly configured to be inserted into the locking hole, and configured to be separated from the locking plate when the locking button is pressed.

14. The seat for vehicles according to claim 13, wherein:
when the user presses the a locking button, coupling between the locking plate connected to the locking button and the locking hook is released; and
when coupling between the locking plate connected to the locking button and the locking hook is released, the cushion assembly is separable from the seat base.

15. The seat for vehicles according to claim 13, wherein, when the locking plate connected to the locking button and the locking hook are coupled to each other, the seat base and the cushion assembly are coupled to each other, and the cushion assembly is placed on the seat base.

* * * * *